(12) United States Patent
Karst et al.

(10) Patent No.: US 7,696,679 B2
(45) Date of Patent: Apr. 13, 2010

(54) SPARK PLUG WITH OPTICAL SENSOR

(75) Inventors: Dieter Karst, Stein am Rhein (CH);
Kurt Vollenweider, Humlikon (CH);
Paul Furter, Russikon (CH)

(73) Assignee: Kistler Holding, AG, Winterthur (CH)

( * ) Notice: Subject to any disclaimer, the term of this patent is extended or adjusted under 35 U.S.C. 154(b) by 166 days.

(21) Appl. No.: 11/576,744

(22) PCT Filed: Oct. 5, 2005

(86) PCT No.: PCT/CH2005/000580

§ 371 (c)(1),
(2), (4) Date: Jan. 22, 2008

(87) PCT Pub. No.: WO2006/037251

PCT Pub. Date: Apr. 13, 2006

(65) Prior Publication Data

US 2008/0211373 A1    Sep. 4, 2008

(30) Foreign Application Priority Data

Oct. 6, 2004    (CH) .................................... 1662/04

(51) Int. Cl.
*H01T 13/48*    (2006.01)
(52) U.S. Cl. ..................................................... 313/129
(58) Field of Classification Search .................. 313/129
See application file for complete search history.

(56) References Cited

U.S. PATENT DOCUMENTS

| | | | | |
|---|---|---|---|---|
| 954,697 | A | * | 4/1910 | Provandie .................... 313/129 |
| 1,452,868 | A | * | 4/1923 | Burt ............................. 313/36 |
| 1,458,636 | A | * | 6/1923 | Wisniowski ................. 313/124 |
| 3,517,247 | A | * | 6/1970 | Istvan .......................... 313/123 |
| 4,393,687 | A | * | 7/1983 | Muller et al. ............... 73/35.07 |
| 4,412,446 | A | * | 11/1983 | Linder et al. ............... 73/35.07 |
| 4,419,212 | A | | 12/1983 | Dietz et al. |
| 4,514,656 | A | * | 4/1985 | Damson et al. ............. 313/11.5 |
| H2034 | H | | 7/2002 | Hopkins |
| 6,668,630 | B1 | * | 12/2003 | Kuglin et al. ............. 73/114.09 |
| 7,022,968 | B1 | * | 4/2006 | Hopper et al. .............. 250/215 |
| 2007/0152557 | A1 | * | 7/2007 | Packard ....................... 313/129 |
| 2008/0239518 | A1 | * | 10/2008 | Sonderegger et al. ....... 359/819 |

OTHER PUBLICATIONS

Minoru Ohsuga et al.: "Study on engine combustion analysis", Hitachi Review, vol. 39, No. 5, Oct. 1990, pp. 299-309, XP000219780, Tokyo, JP p. 301, left-hand column, paragraph 1; figure 2.

* cited by examiner

*Primary Examiner*—Peter Macchiarolo
(74) *Attorney, Agent, or Firm*—Dority & Manning, P.A.

(57) ABSTRACT

A spark plug has an optical window for sensing combustion processes in an Otto engine. The optical window is located in the central electrode of the spark plug and has at least one lens exposed to the combustion chamber, as well as at least one flexible optical fiber which can conduct light through the spark plug from the lens to an analysis system.

12 Claims, 2 Drawing Sheets

SPARK PLUG WITH OPTICAL SENSOR

CROSS-REFERENCE TO RELATED APPLICATIONS

This application claims priority to Swiss Application No. 166/04 filed Oct. 6, 2004 and International Application Serial No. PCT/CH2005/000580 filed Oct. 5, 2005.

TECHNICAL FIELD

The invention relates to a spark plug having an optical window for sensing combustion processes in an Otto engine wherein the optical window is located in the central electrode of the spark plug.

BACKGROUND OF THE INVENTION

To examine knocking during combustion in an Otto engine optical sensors are employed for example. They measure the brightness within the combustion chamber and thus provide a clue with respect to the time sequence of the events during combustion. For this purpose, optical sensors are for example arranged in spark plugs. However, these have a tendency to accumulate dirt after a short time for which reason optical sensors are sometimes mounted in the central electrode of sensors. During ignition the surfaces are subject to high temperatures whereby they are cleaned because the soot accumulated thereon is burned by the heat.

Spark plugs of the type mentioned in the beginning are known. DE 3001711 by Robert Bosch GmbH details various embodiments wherein for example a sapphire rod is used or a bundle of optical fibers. A disadvantage of these arrangements is that the sapphire rod has a very narrow opening angle and that in addition the optical fiber bundle cannot be assigned to the exact positions.

It has to be pointed out that for the examining of knocking a large surface area around the spark plug must be analyzed.

BRIEF SUMMARY OF OBJECT OF THE INVENTION

It is an object of the present invention to provide a spark plug having an optical sensor which can sense the light emission over a large area around the spark plug and optionally enables direction-dependent analysis.

This object has been achieved by the fact that the optical window has at least one lens exposed to the combustion chamber as well as at least one flexible optical fiber which can conduct light from the lens through the spark plug to an analysis system.

SHORT DESCRIPTION OF THE DRAWINGS

Figure 1:
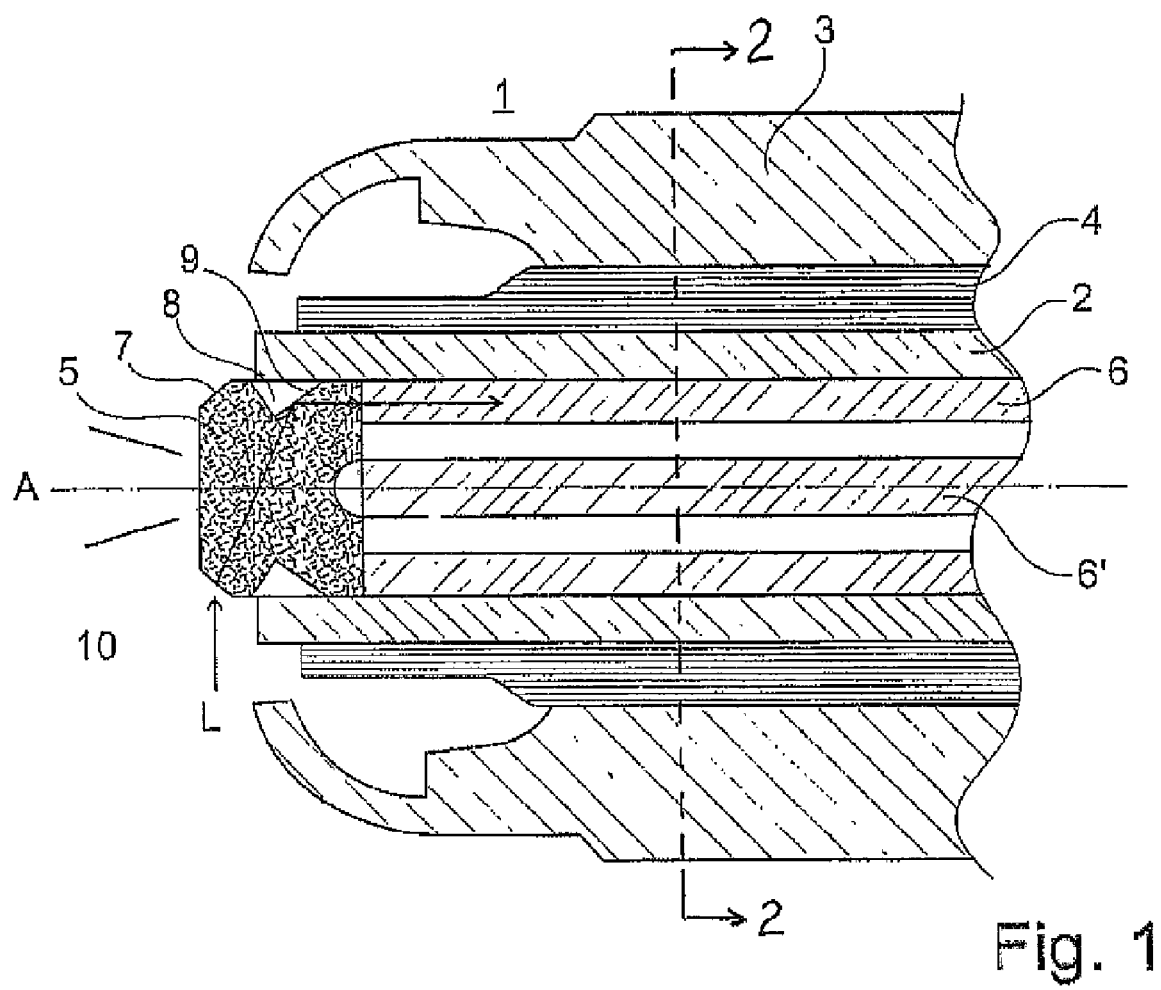
Figure 2:
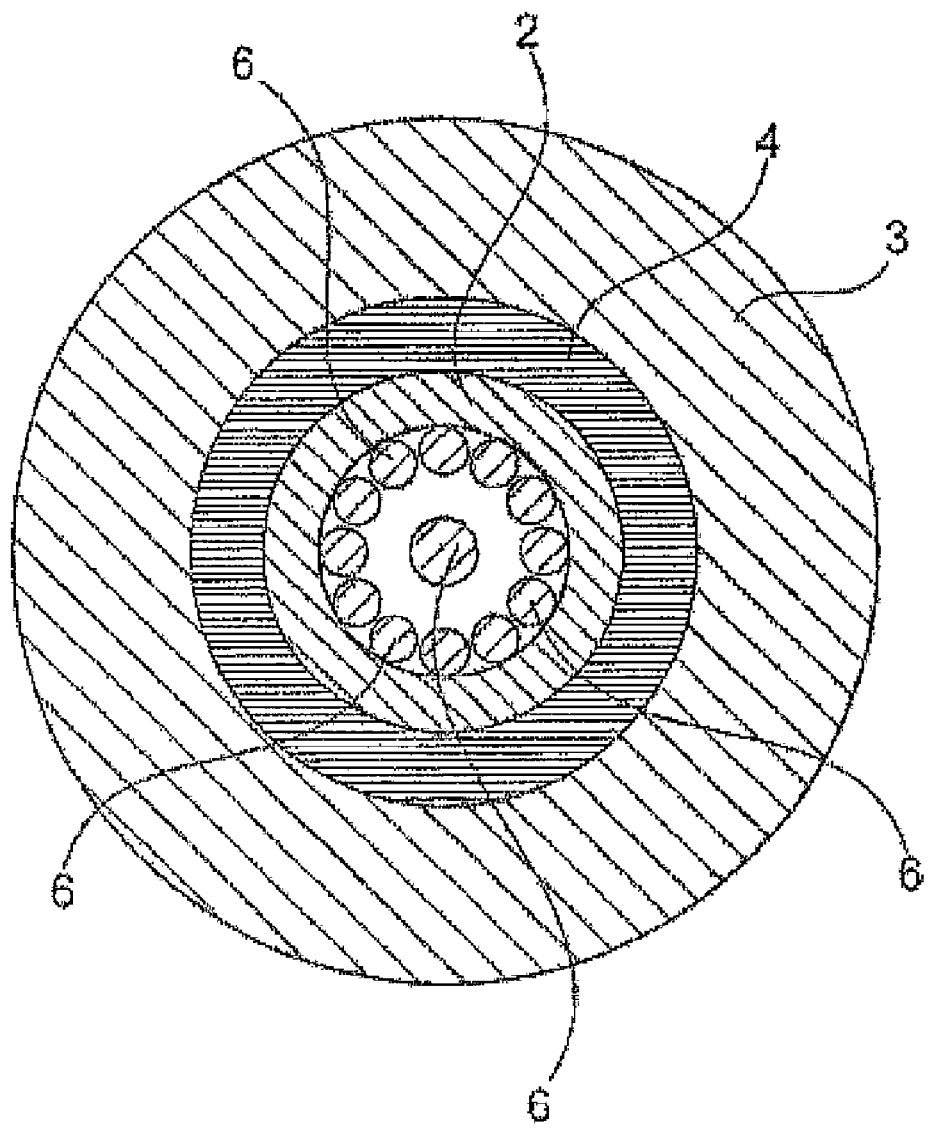

In the following the invention will be explained in more detail with respect to the drawings. The Figures show FIG. 1 a schematic representation of a tip of a spark plug according to the invention;

FIG. 2 cross sectional view along the direction of arrows 2-2 of FIG. 1.

DETAILED DESCRIPTION OF EMBODIMENTS OF THE INVENTION

Similar designations in the Figures refer to the same explanations.

FIG. 1 shows a schematic representation of a tip of a spark plug 1 according to the invention. The latter comprises a central electrode 2 and a measuring electrode 3, these two electrodes being separated from each other by an insulator 4. During an ignition event a spark strikes between the two electrodes. In the examples shown herein air-surface gap spark plugs are shown which have the advantage that the view of the optical window is less impaired. Other spark plugs, however, can be used as well.

The advantage is, however, that series spark plugs can be used since these are much more cost-effective in preparation than special purpose fabrications.

The central electrode 2 has the shape of a tube and therefore has an inner opening. This opening has, at its end facing the combustion chamber 10, a lens 5.

The axis of the lens 5 always extends in the direction of the spark plug axis.

In FIG. 1 the lens 5 is embodied in a way that light L incoming perpendicularly with respect to the lens axis is deflected by 90° into the lens 5. The light beam exiting from the lens 5 is conducted into one of the plurality of flexible optical fibers 6 which are arranged adjacent to the lens 5 at the inner surface thereof on a circle, as shown in FIG. 2. Thus, the light intensity can be evaluated in a site-dependent manner since adjoining optical fibers receive light from other sectors.

A preferred embodiment of the lens 5 is shown in FIG. 1. This lens has an essentially cylindrical shape wherein the edge facing the combustion chamber 10 has a refractive conical surface 7. At this refractive conical surface 7 light L impinging on the lens 5 from a direction perpendicular to the axis A is redirected to an opposed indentation 8. This indentation 8 extends in a conical shape on the lateral surface area of the cylinder. Its conical surface 9 opposite to the combustion chamber 10 is coated with a metal layer. The redirected light beam impinging onto this metallized conical surface 9 is deflected in the desired direction parallel to axis A of the lens 5 and finally enters the optical fiber 6. The mirror is achieved by coating the conical surface 9 with platinum or gold for example. Since this metal layer is not directly exposed to the combustion chamber 10 there is no risk of damage due to the combustion in the engine.

In addition, another optical fiber 6' can be arranged adjacent to the lens centrally at the inner surface thereof. Advantageously, the inner surface of the lens 5 is embodied with a concave shape.

Preferably, the lenses are manufactured from sapphire or quartz glass.

The lenses as well as the optical fibers are surrounded by the central electrode 2 as by a sheath that preferably is made of platinum or gold or an alloy thereof.

Generally, the optical sensor including the lenses and the optical fibers has a diameter of less than 2 mm, mostly between 1.5 and 1.8 mm. The central cavity of the central electrode 2 therefore must have these dimensions.

It is important for the application range that the spark plug can withstand a permanent temperature load of 600° C. and a temporary temperature load of 900° C.

The advantage of this invention is that with this spark plug a measuring system can be provided which on the one hand does not accumulate dirt due to the arrangement of the optical windows in the central electrode 2 while on the other hand measurement data can be acquired separately in distinct regions in a targeted manner which can also be evaluated separately.

In addition, by means of an optical fiber which is arranged centrally light from the whole combustion chamber can be detected.

The invention claimed is:

1. A spark plug for sensing combustion processes in the combustion chamber of an Otto engine being monitored by an analysis system, comprising:

a body defining a spark plug axis and including a central electrode and an optical window, wherein the optical window is located in the central electrode of the spark plug and wherein the optical window has at least one lens exposed to the combustion chamber and defining a lens axis extending in the same direction as the axis of the spark plug, at least one flexible optical fiber which conducts light from the lens through the spark plug so that the light can be provided to the analysis system, and wherein the lens is adapted to redirect by 90° within the lens before exiting the lens, light which enters the lens from a direction perpendicular to the lens axis.

2. A spark plug according to claim 1 wherein the spark plug is an air-surface gap spark plug.

3. A spark plug according to claim 1 wherein the spark plug is a series spark plug.

4. A spark plug according to claim 1 wherein the exterior surface of the lens facing in the direction of the combustion chamber has a conical surface.

5. A spark plug according to claim 1, wherein adjacent to the lens at the inner surface thereof there is arranged a plurality of optical fibers on a circle.

6. A spark plug according to claim 1, wherein the lens essentially has a cylindrical shape wherein the edge facing the combustion chamber has a refractive conical surface and the lateral surface area of the cylinder has an annular indentation defining a conical surface opposite to the combustion chamber and coated with a metal layer.

7. A spark plug according to claim 1, wherein adjacent to the lens at the inner surface thereof an optical fiber is centrally arranged.

8. A spark plug according to claim 7 wherein the inner surface of the lens is embodied with a concave shape.

9. A spark plug according to claim 1, wherein that at least one lens is made from one of sapphire or quartz glass.

10. A spark plug according to claim 1 wherein the central electrode surrounds the optical window as by a sheath functioning as the central electrode.

11. A spark plug according to claim 10 wherein the sheath is essentially made of one of platinum, gold or an alloy thereof.

12. A spark plug according to claim 1 wherein the spark plug can withstand a permanent temperature load of 600° C. and a temporary temperature load of 900° C.

* * * * *